United States Patent [19]

Halverson et al.

[11] Patent Number: 4,879,262

[45] Date of Patent: Nov. 7, 1989

[54] COMBUSTION SYNTHESIS OF BORIDE AND OTHER COMPOSITES

[75] Inventors: Danny C. Halverson, Modesto; Beverly Y. Lum, Livermore; Zuhair A. Munir, Davis, all of Calif.

[73] Assignee: The United States of America as represented by the United States Department of Energy, Washington, D.C.

[21] Appl. No.: 225,413

[22] Filed: Jul. 28, 1988

[51] Int. Cl.$^4$ ............................................. C04G 35/52
[52] U.S. Cl. ........................................ 501/87; 419/45; 419/63; 419/5; 501/93; 501/96
[58] Field of Search ................. 419/45, 63, 5; 501/96, 501/87, 93

[56] References Cited

U.S. PATENT DOCUMENTS 4,289,720  9/1981  Yajima et al. .......................... 501/97
4,606,902  8/1986  Ritter ..................................... 501/96
4,718,941  1/1988  Halverson et al. .................... 75/236
4,732,556  3/1988  Chiang et al. .......................... 419/49
4,800,065  1/1989  Christodoulou et al. ............. 420/590

Primary Examiner—Stephen J. Lechert, Jr.
Attorney, Agent, or Firm—Henry P. Sartorio; L. E. Carnahan; Judson R. Hightower

[57] ABSTRACT

A self-sustaining combustion synthesis process for producing hard, tough, lightweight $B_4C/TiB_2$ composites is based on the thermodynamic dependence of adiabatic temperature and product composition on the stoichiometry of the $B_4C$ and $TiB_2$ reactants. For lightweight products the composition must be relatively rich in the $B_4C$ component. $B_4C$-rich composites are obtained by varying the initial temperature of the reactants. The product is hard, porous material whose toughness can be enhanced by filling the pores with aluminum or other metal phases using a liquid metal infiltration process. The process can be extended to the formation of other composites having a low exothermic component.

12 Claims, 6 Drawing Sheets

COMBUSTION SYNTHESIS OF BORIDE AND OTHER COMPOSITES

BACKGROUND OF THE INVENTION

The United States Government has rights in this invention pursuant to Contract No. W-7405-ENG-48 between the United States Department of Energy and the University of California for the operation of Lawrence Livermore National Laboratory.

The invention relates generally to hard, tough lightweight composite materials, and more particularly to $B_4C/TiB_2$ composites and methods of making same.

U.S. Pat. No. 4,605,440 issued Aug. 12, 1986 to Halverson et al describes $B_4C$-reactive metal composites, particularly $B_4C$-Al composites, and methods of making same. The process involves achieving the conditions for liquid phase sintering of the metal and $B_4C$ to occur. A variety of consolidation techniques can be used, with lower temperature and pressure methods being preferred. Fully dense composites with tailorable microstructures can be produced.

U.S. Pat. No. 4,718,941 issued Jan. 12, 1988 to Halverson et al. describes an improved infiltration process in which a chemically pretreated porous $B_4C$ or other boron or boride ceramic matrix or sponge is infiltrated with molten aluminum or other metal to form metal-ceramic composites.

Previous attempts to fabricate $B_4C$-Ti composites using liquid-phase sintering or infiltration approaches were unsuccessful because of the rapid diffusion of boron and carbon atoms into titanium. This rapid diffusion phenomenon, "capillary-kinetic slowdown," results in the inhibition of the capillary action of molten titanium in porous $B_4C$ compacts because of the formation of titanium borides and titanium carbides at the titanium surface prior to melting.

Attempts at conventional sintering and hot pressing at temperatures greater than 2273 K have always resulted in microstructures that were rich in $TiB_2$, with $B_4C$ as the minor accompanying phase.

Combustion synthesis of powder compacts has been used to produce a variety of refractory ceramic materials including nitrides and nitride-oxide composites. The process uses heat evolved during spontaneous chemical reactions between mixtures of solids or solids and gases produced as a combustion wave initiated by an ignition source rapidly propagates through the compact. The key to self-propagating high temperature synthesis (SHS) is that once initiated highly exothermic reactions will become self-sustaining and will propagate through the reactant mixture in the form of a combustion wave. As the combustion wave (front) advances, the reactants are converted to products. A major advantage of SHS as a process for the synthesis of materials is the energy savings associated with the use of self-sustaining reactions. However, the combustion synthesis of $B_4C$ is not possible because it is a low exothermic material so the reaction does not generate enough heat to sustain the process.

SUMMARY OF THE INVENTION

It is an object of the invention to develop hard, tough materials that are light in weight.

It is also an object to obtain various $B_4C/TiB_2$ compositions by means of combustion synthesis.

It is another object of the invention to obtain $B_4C/TiB_2$ compositions which are rich in $B_4C$.

The invention is a combustion synthesis method for making $B_4C/TiB_2$ composites by self-propagating combustion synthesis of a powder compact using the highly exothermic Ti-B reactions to drive the low exothermic $B_4C$ formation. The powder compact is formed of B, C and Ti powders, or hydrides thereof, or oxides thereof, or mixtures thereof. The invention includes the formation of a $B_4C$ rich composite by preheating the powder compact, and also includes the resulting $B_4C/TiB_2$ ceramic composites. The invention also includes the infiltration of the ceramic composite with a molten metal, and the resulting dense infiltrated metal-ceramic composite.

To produce lightweight composites (theoretical density less than 3.0 g/cm$^3$) by the invention, a two step process is used. First, the maximization of the lighter $B_4C$ component in the $B_4C/TiB_2$ product is achieved by increasing the initial temperature of the reactants prior to combustion in the synthesis process. Second, the infiltration of a low-density metal phase, e.g. aluminum or an aluminum alloy, is used to densify the porous $B_4C/TiB_2$ products that result from the synthesis process. These materials are hard, and their toughness is improved intrinsically through their multiphase nature and extrinsically through the infiltration of a molten metal phase into the resultant porous product.

Thus, the invention encompasses the processes of forming a $B_4C/TiB_2$ matrix with a controllable product mole ratio by self-propagating combustion synthesis, and then infiltrating the matrix to form a fully dense composite, as well as the matrix and infiltrated composite formed by the processes. More generally the invention encompasses a method of self-propagating combustion synthesis of a mixture of materials wherein exothermic heat of reaction from a high adiabatic temperature material is used to produce combustion of low exothermic materials. By this method low exothermic SiC can be formed by using a Si-C-Ti or Si-C-Mo compact so that the high exothermic Ti-C and Mo-Si reactions produce TiC/SiC and $MoSi_2$/SiC composites, respectively. Preheating of the compact allows control of the resulting mole ratios so that a high concentration of the low exothermic material is produced.

DETAILED DESCRIPTION

Figure 1:
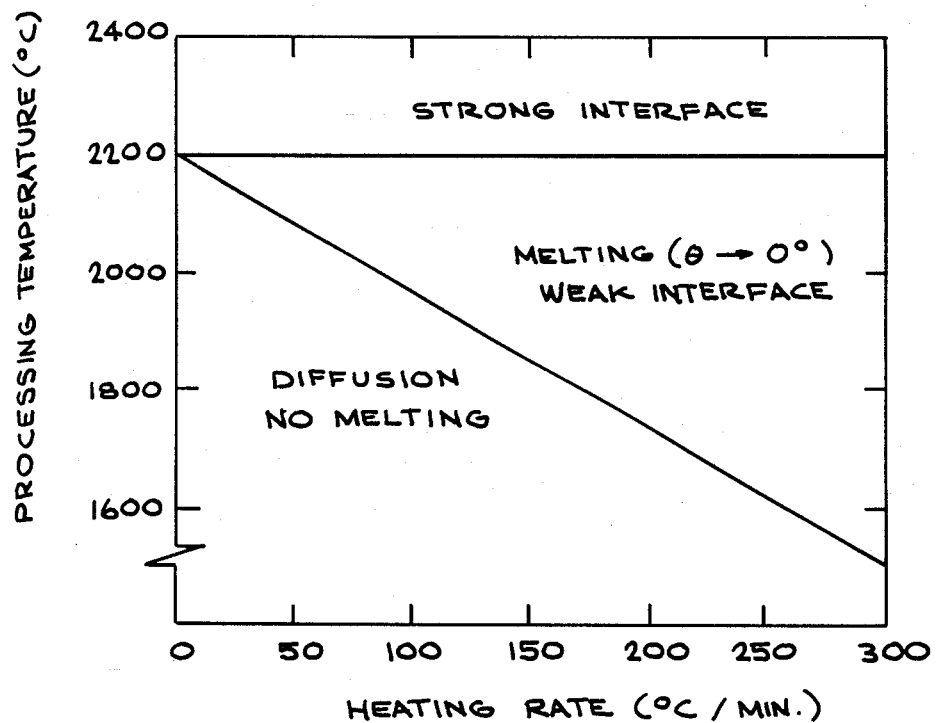
FIG. 1 is a graph of titanium sessile-drop characteristics on boron carbide.

Although liquid phase sintering of $B_4C$-Ti has proven unsuccessful, it is possible, however, to overcome capillary-kinetic slowdown by increasing the rate of heating during processing so that the titanium melts before the diffusion-associated formation of borides and carbides occurs. This effect is shown in FIG. 1 for the $B_4C$-Ti system. For titanium to melt and wet ($\theta=0°$) $B_4C$ near the melting point of titanium, it is necessary to heat the system at 300° C. per minute or faster.

Even with this rapid heating, however, the interface between the $B_4C$ and titanium is weak because of the presence of excessive TiB. At temperatures near the melting point of titanium, wetting is driven by the initial reaction:

$$5Ti + B_4C \rightarrow 4TiB + TiC. \quad (1)$$

When the processing temperature is increased to 2473 K, a strong interfacial bond between $B_4C$ and titanium is possible through the reaction:

$$3Ti + B_4C \rightarrow 2TiB_2 + TiC. \quad (2)$$

This strong interface is attributable to the presence of $TiB_2$ rather than TiB. It should be noted that TiB undergoes peritectic decomposition to liquid+$TiB_2$ near 2473 K.

Because rapid heating rates and high temperatures are required to fabricate $B_4C$-Ti composites, combustion synthesis appears to be the most practical processing approach.

THEORY

Table 1 shows the product phases that are possible using elemental boron, carbon, and titanium reactants and shows some of their physical properties that are relevant to meeting the objectives of this invention and the combustion synthesis process in general. $B_4C$ has a very low adiabatic temperature of 1000 K, compared to its melting point of 2740 K, so it will be very difficult, if not impossible, to form by self-sustaining combustion synthesis.

TABLE 1

| | Properties of product phases | | | | |
|---|---|---|---|---|---|
| Phase | $T_{mp}$ (K) | $T_{ad}$ (K) | $\Delta H^0_{1,298\,K}$ (cal/mol) | $\rho_{th}$ (g/cm³) | H (kg/mm²) |
| $B_4C$ | 2740 | 1000 | −17,000 | 2.52 | 2750–4950 |
| TiB | 2500* | 2600 | −38,386 | 4.56 | — |
| $TiB_2$ | 3190 | 3190 | −77,400 | 4.50 | 3000–3600 |
| TiC | 3290 | 3290 | −44,100 | 4.93 | 1550–3200 |

*Decomposes rather than melts at this temperature.

Production of $B_4C/TiB_2$ microstructures was pursued because (1) these phases were dominant in the strong, interfacially bonded materials previously produced by liquid phase sintering; (2) these phases exhibit the highest hardnesses with the lowest theoretical densities; (3) boron carbide has a low melting point relative to the adiabatic temperature of $TiB_2$, which should result in $B_4C$-liquid rearrangement of crystalline $TiB_2$ for increasing product density; (4) titanium diboride exhibits the largest heat of formation (exothermic potential) and will be of the greatest assistance in producing $B_4C$, which has a small exothermic potential.

Some possible reactions and the theoretical densities of their products are shown in Table 2. Because a product with low specific gravity is desired, those reactions that produce $B_4C$-rich microstructures are most desirable. To determine the optimum composition it is necesssary to first calculate the adiabatic combustion temperature for the following three general cases:

$$x\Delta H^0_{fB_4C}(T_0) + y\Delta H^0_{fTiB_2}(T_0) = x\int_{T_0}^{T_{ad}} C_p(s)_{B_4C}dT + y\int_{T_0}^{T_{ad}} C_p(s)_{TiB_2}dT, \quad (3)$$

$$x\Delta H^0_{fB_4C}(T_0) + y\Delta H^0_{fTiB_2}(T_0) = x\int_{T_0}^{T_{mp}} C_p(s)_{B_4C}dT + xv\Delta H_{mB_4C} + y\int_{T_0}^{T_{mp}} C_p(s)_{TiB_2}dT, \quad (4)$$

$$x\Delta H^0_{fB_4C}(T_0) + y\Delta H^0_{fTiB_2}(T_0) = x\int_{T_0}^{T_{mp}} C_p(s)_{B_4C}dT + x\Delta H_{mB_4C} + x\int_{T_{mp}}^{T_{ad}} C_p(l)_{B_4C}dT + y\int_{T_0}^{T_{ad}} C_p(s)_{TiB_2}dT. \quad (5)$$

where $C_p(l)$ = specific heat of a particular liquid product phase,
$C_p(s)$ = specific heat of a particular solid product phase,
$\Delta H_f^0$ = heat of formation of a specific product phase,
$\Delta H_m$ = heat of melting of a specific product phase,
$T_o$ = initial temperature of reactants before combustion,
$T_{ad}$ = adiabatic temperature,
$T_{mp}$ = melting-point temperature,
v = volume percent of $B_4C$ melted,
x = number of moles of $B_4C$ in product,
y = number of moles of $TiB_2$ in product.

TABLE 2

| Selected B—C—Ti reactions ($\rho_{th}$ in g/cm³) | |
|---|---|
| 10B + C + 3Ti → | $B_4C$ + $3TiB_2$ (3.86) |
| 8B + C + 2Ti → | $B_4C$ + $2TiB_2$ (3.68) |
| 6B + C + 2Ti → | $B_4C$ + $TiB_2$ (3.34) |
| 10B + 2C + 2Ti → | $2B_4C$ + $TiB_2$ (3.04) |
| 14B + 3C + Ti → | $3B_4C$ + $TiB_2$ (2.90) |
| 18B + 4C + Ti → | $4B_4C$ + $TiB_2$ (2.82) |
| 22B + 5C + Ti → | $5B_4C$ + $TiB_2$ (2.76) |

Equations (3) and (5) can be used to calculate the adiabatic temperatures below and above the melting point of $B_4C$, respectively. Equation (4) is used to determine the percent of $B_4C$ melted when the adiabatic temperature is equal to the melting point of $B_4C$. Equations (3) through (5) can also be used to calculate the adiabatic temperatures (percent of $B_4C$ melted) at different initial temperatures for any $B_4C/TiB_2$ mole ratio. Thus equations (3)–(5) show how to raise the initial temperature $T_o$ to get a higher adiabatic temperature to produce a greater amount of $B_4C$. Otherwise, because the adiabatic temperature of $B_4C$ is so low, as shown in Table 1, if all the heat is provided by $TiB_2$ formation without raising the initial temperature, very little $B_4C$ is formed.

Figure 2:
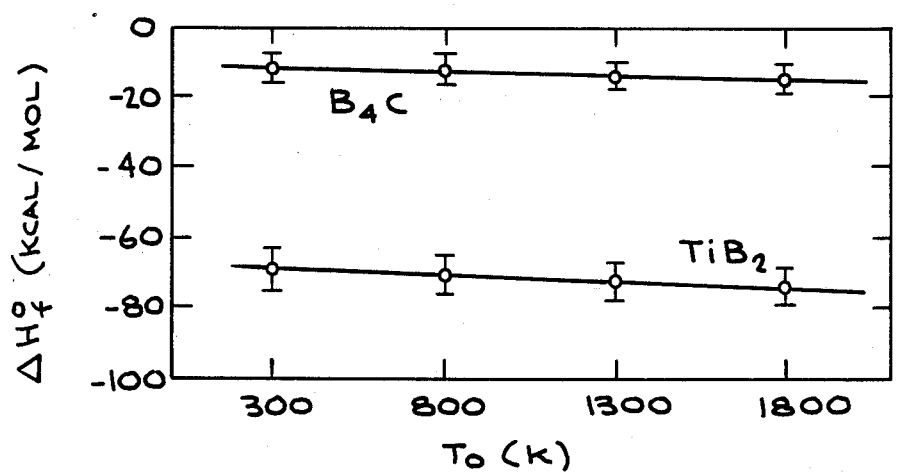
FIG. 2 shows the variation of the heat of formation of $B_4C$ and $TiB_2$ with temperature.

The adiabatic temperatures for mole ratios of $B_4C/TiB_2$ up to 5 at initial temperatures of 300, 800, 1300, and 1800 K were calculated. Since the initial temperature is a variable in these calculations, the appropriate enthalpies of formation of $B_4C$ and $TiB_2$ must be used. FIG. 2 shows how these functions vary with temperature. Only minor changes occur for $B_4C$ and $TiB_2$ between 300 and 1800 K.

Figure 3:
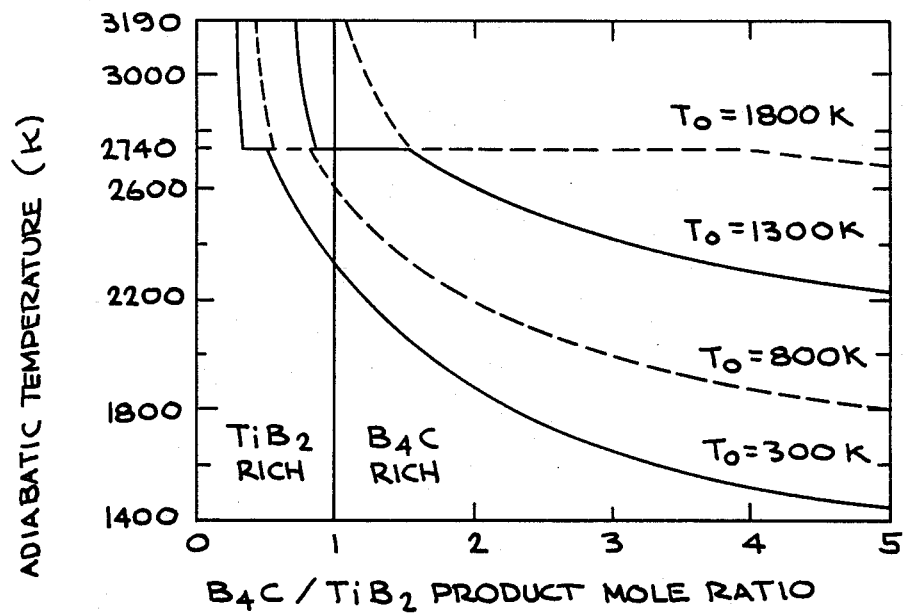
FIG. 3 is a graph of adiabatic temperatures as a function of product mole ratios at different initial temperatures.

FIG. 3 shows the results of the computer-generated adiabatic temperatures as functions of $B_4C/TiB_2$ product mole ratios at different initial temperatures. These results point to certain key factors for the processing of these materials. First and most important is that the theoretical adiabatic temperature can be increased for increasing mole ratios of $B_4C/TiB_2$ products by simply increasing the initial temperature of the reactants prior to combustion. In addition, the range of mole ratios from the onset of $B_4C$ melting (right-hand side of the flat region on each curve at 2740 K) to the completion of $B_4C$ melting (left-hand side of the flat region) increases as the initial temperature increases. The experimental production of $B_4C$-rich microstructures is achieved by applying these principles of the invention.

EXPERIMENTAL PROCEDURE/EXAMPLES

Figure 4:
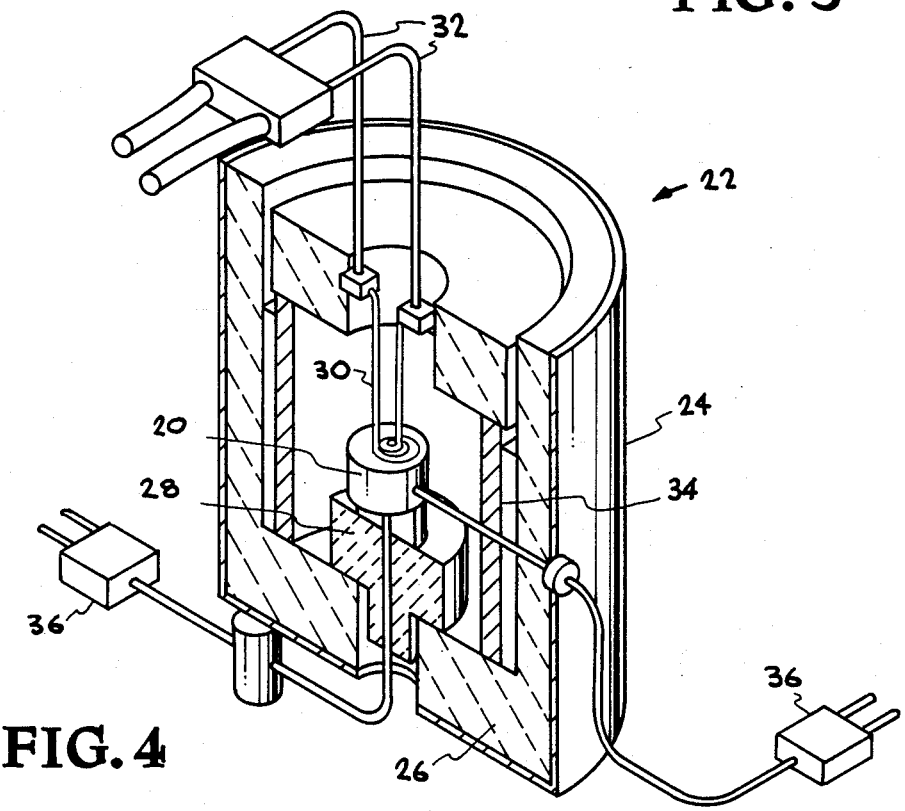
FIG. 4 is a perspective sectional view of a temperature-controlled combustion chamber.
Figure 5:
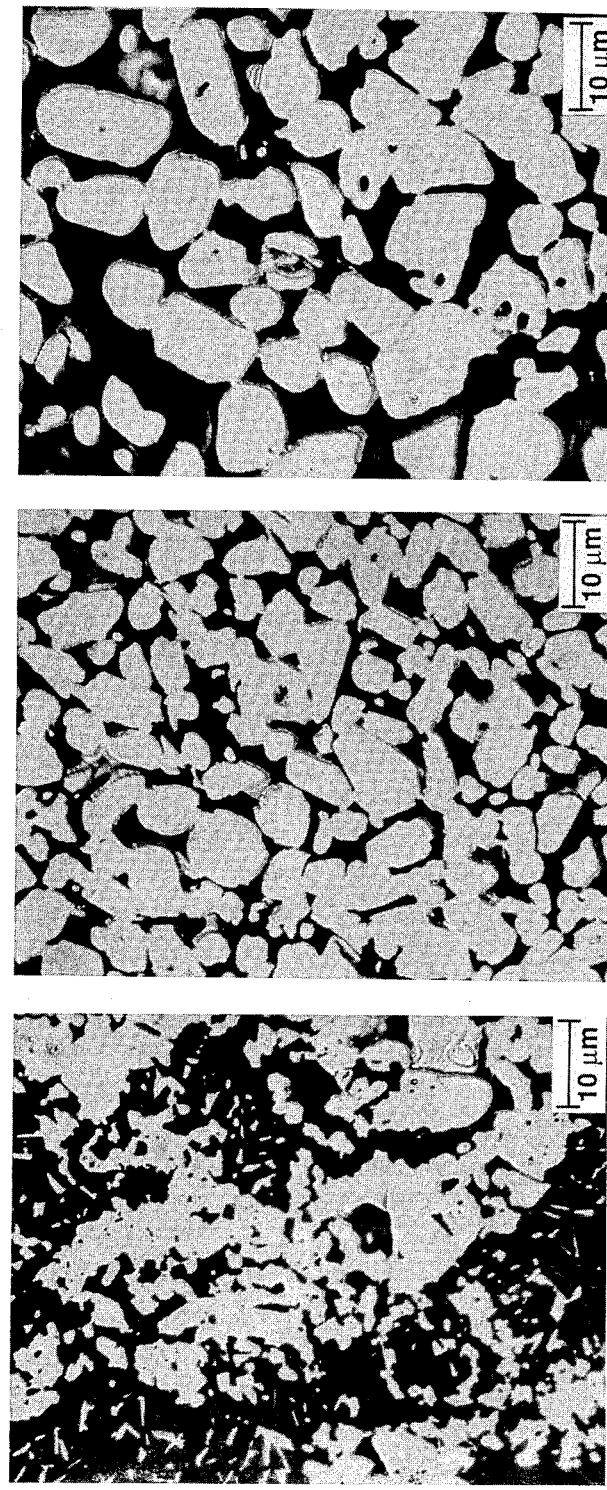
FIGS. 5, 6, and 7 are petrographic comparisons for a $B_4C/TiB_2$ product mole ratio of 0.5, 1.0, and 2.0, respectively, synthesized at different initial temperatures.

Experiments were performed using elemental boron, carbon, and titanium powders. The materials used were Callery amorphous boron (24.5 $m^2/g$, washed in $CH_3OH$ for 72 hours to remove $B_2O_3$; Cabot Monarch-700 amorphous carbon (234 $m^2/g$, stored in air; and Alfa 99883 α-titanium (13.3 $m^2/g$), stored in argon. Appropriate amounts of these reactants were weighed out to produce $B_4C/TiB_2$ mole ratios of 0.5, 1.0, 1.5, 2.0, and 3.0. The reactant powders were vibratory-mixed for 5 minutes and then axially pressed at 27.6 MPa (4000 psi) into pellets 2.54 cm (1 in.) in diameter by 2.54 cm high. No binders or solvents were used during mixing or pressing but binders could be used. The pellets were ignited in a temperature controlled combustion chamber as shown in FIG. 4. Chamber 22 is formed in a stainless steel can 24 with a thick thermally insulating material 26 therein. A pellet 20 is placed on a graphite pedestal 28 inside chamber 22. Experiments were carried out in the combustion chamber, which was placed in an argon glove box containing less than 6 ppm of oxygen. Ignition within the chamber was accomplished using a resistance-heated tungsten coil 30 which is connected to electrodes 32. Alternatively other ignition sources such as lasers or primer pellets such as $TiB_2$ may be used. Because of the temperature limitation of the clamshell heater 34 which is used to preheat the chamber and pellet, only initial temperatures of 300, 800, and 1200 K. were studied. Pellet temperature was monitored internally and externally using chromel-alumel thermocouples 36. Initial temperatures above room temperature were reached by heating the pellet at 7 K. per minute. Pellets that underwent combustion were petrographically examined and X-rayed for composition.

Table 3 and FIGS. 5 through 8 are illustrative results. Petrographic comparisons are made in FIGS. 5, 6, and 7 for the $B_4C/TiB_2$ product mole ratios of 0.5, 1.0, and 2.0, respectively. These figures and the X-ray diffraction results of Table 3 confirm that as $B_4C/TiB_2$ product mole ratios are increased, the initial temperature required to sustain combustion must also be increased. Furthermore, the amount of $B_4C$ (dark phase) rapidly increases in volume as the $B_4C/TiB_2$ product mole ratios are increased.

Different initial temperatures also result in different microstructures for a specific $B_4C/TiB_2$ mole ratio produced. For example, in FIG. 5 for a $B_4C/TiB_2$ mole ratio of 0.5, three different microstructures are illustrated. At $T_o=300$ K., the adiabatic temperature is enough to sustain combustion, but it is slightly below the melting point of $B_4C$. Thus, both $B_4C$ and $TiB_2$ are synthesized in the solid state. At $T_o=800$ K., the adiabatic temperature is high enough to allow 100% of the $B_4C$ to be melted. This is evidenced by the fact that the solid $TiB_2$ grains are surrounded by a previously molten $B_4C$ phase. At $T_o=1200$ K., the adiabatic temperature is high enough to allow both $B_4C$ and $TiB_2$ to be molten during synthesis.

Figure 6:
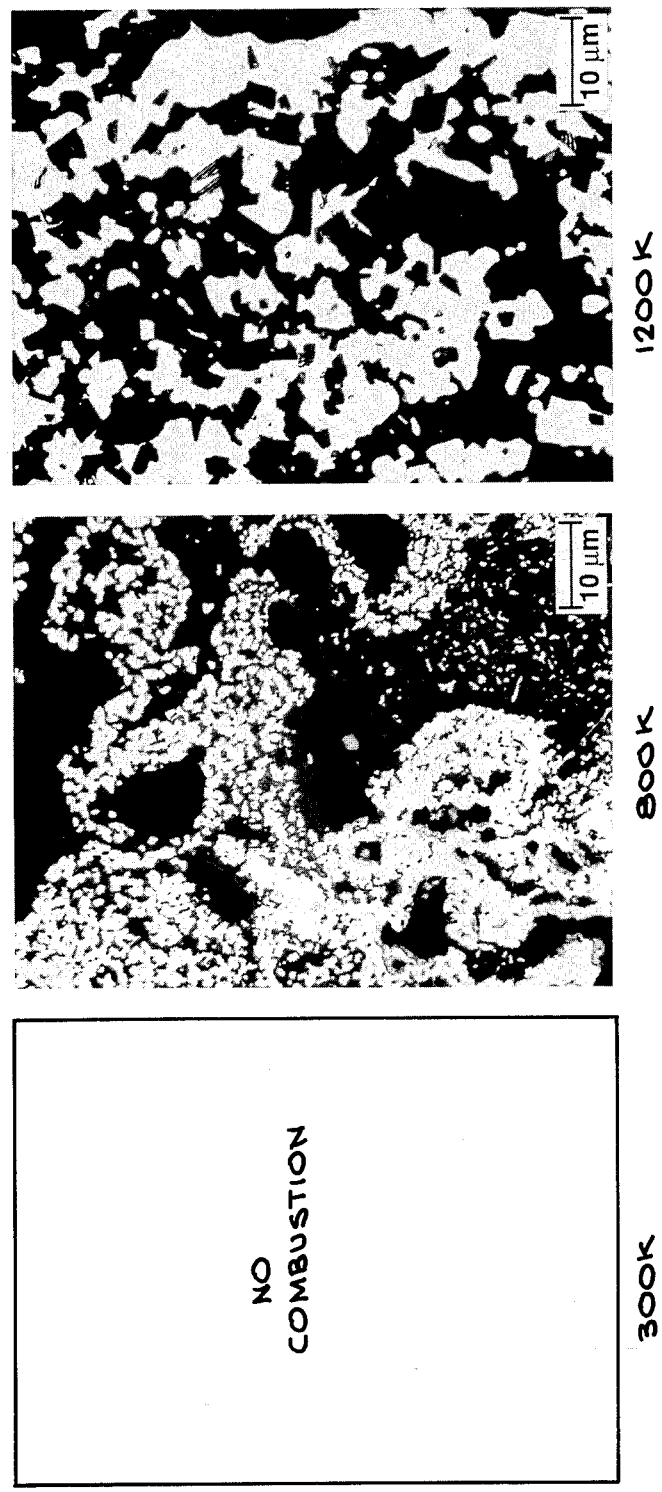

FIG. 6 shows microstructures at a $B_4C$ mole ratio of 1.0. At $T_o=300$ K., the adiabatic temperature was too low to sustain combustion. At $T_o=800$ K., the adiabatic temperature is less than the melting point of $B_4C$, and at $T_o=1200$ K., $B_4C$ is about 80% melted.

Figure 7:
Figure 7:
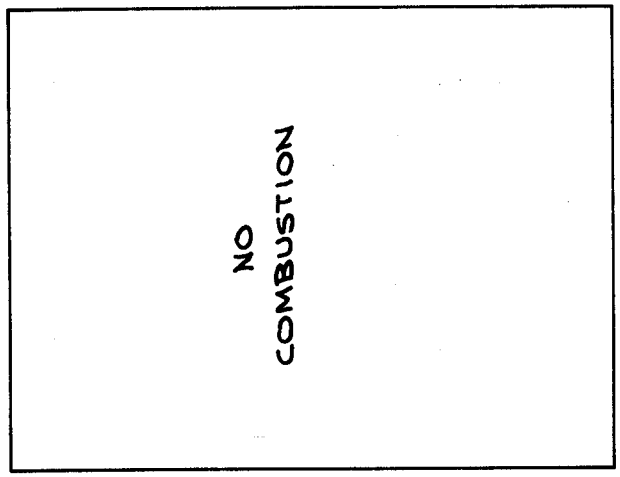
Figure 7:
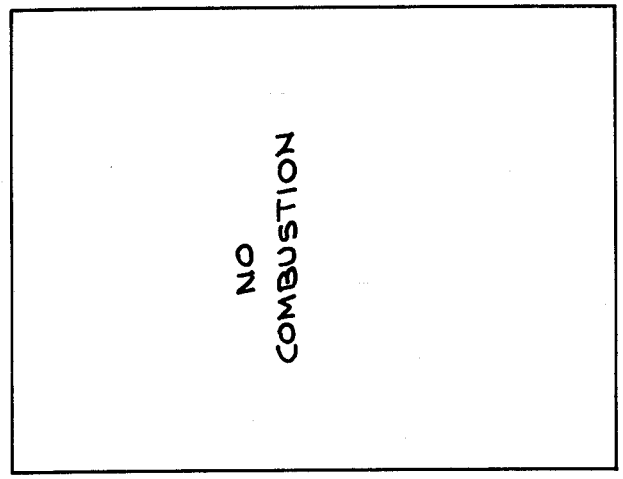

FIG. 7 shows microstructures at a $B_4C/TiB_2$ mole ratio of 2.0. Combustion was sustained only at an initial temperature of 1200 K., for which the adiabatic temperature is below the melting point of $B_4C$.

TABLE 3

| $B_4C/TiB_2$ mole ratio | $T_0$ (K) | Qualitative phase analysis X-ray diffraction | | | |
|---|---|---|---|---|---|
| | | Major | Minor | Secondary | Trace |
| 0.5 | 300 | $TiB_2$ | | | $B_4C$ |
| | 800 | $TiB_2$ | | | $B_4C$ |
| | 1200 | $TiB_2$ | | $B_4C$ | TiC |
| 1.0 | 300 | N.C.[a] | — | — | — |
| | 800 | $TiB_2$ | | $B_4C$ | TiC |
| | 1200 | $TiB_2$ | | $B_4C$ | TiB |
| 1.5 | 300 | N.C.[a] | — | — | — |
| | 800 | $TiB_2$ | TiC | $B_4C$ | |
| | 1200 | $TiB_2$ | | $B_4C$ | TiC |
| 2.0 | 300 | N.C.[a] | — | — | — |
| | 800 | N.C.[a] | — | — | — |
| | 1200 | $TiB_2$ | $B_4C$ | | TiC |
| 3.0 | 300 | N.C.[a] | — | — | — |
| | 800 | N.C.[a] | — | — | — |
| | 1200 | $TiB_2$ | $B_4C$ | | TiC |

[a]N.C. means no combustion

Table 3 shows that it was possible to fabricate $B_4C/TiB_2$ product mole ratios as high as 3.0. Again, this only occurred when $T_o=1200$ K. The table also shows that TiC and TiB are often formed, which is most likely due to inhomogeneities associated with the vibratory mixing process used.

Figure 8:
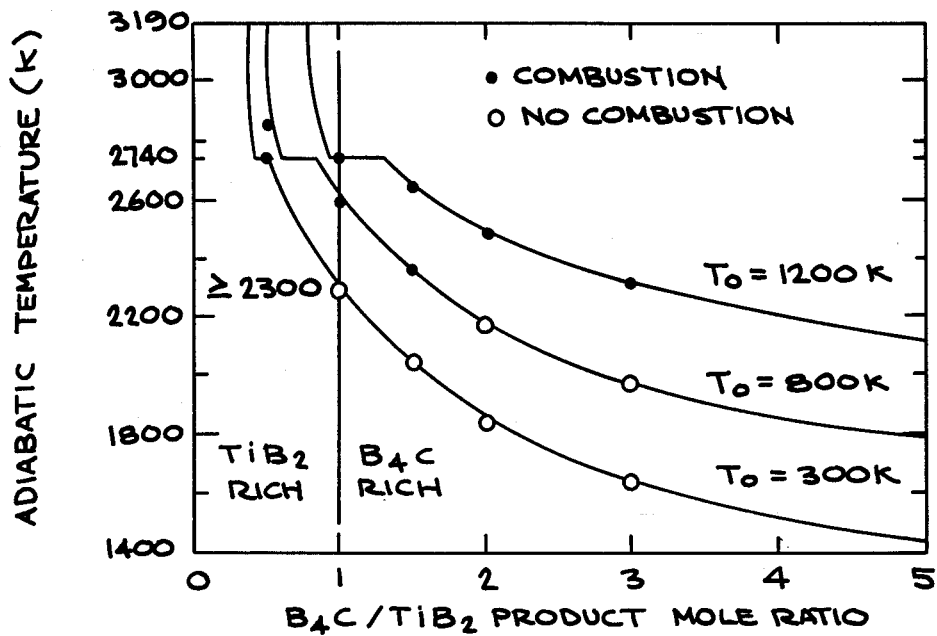
FIG. 8 shows theoretical curves and experimental results for several $B_4C/TiB_2$ product mole ratios at three initial temperatures.

FIG. 8 shows the theoretical curves calculated for $T_o=300$, 800, and 1200 K., along with the experimental data points for the different $B_4C/TiB_2$ product mole ratios experimentally obtained. If a horizontal line is drawn between the solid and open experimental data points of FIG. 8, a critical or minimum adiabatic temperature of approximately 2300 K. is indicated.

The $B_4C/TiB_2$ products produced by combustion synthesis are not fully dense. Typically, these materials have approximately 50% porosity after synthesis, which makes them well suited for liquid-metal infiltration. Accordingly, it is also a part of the invention to form fully dense infiltrated $B_4C/TiB_2$ composites by infiltrating the porous structure formed by combustion synthesis with molten aluminum or other molten metal or alloy.

| Precursor | Infiltrant | $\rho_{th}$ (g/cm$^3$) |
|---|---|---|
| B$_4$C + 3 TiB$_2$ | Al (40 vol %) | 3.40 |
| B$_4$C + TiB$_2$ | Al (40 vol %) | 3.08 |
| 3 B$_4$C + TiB$_2$ | Al (40 vol %) | 2.82 |
| 5 B$_4$C + TiB$_2$ | Al (40 vol %) | 2.74 |
| 5 B$_4$C + TiB$_2$ | Mg (40 vol %) | 2.35 |

Figure 9:
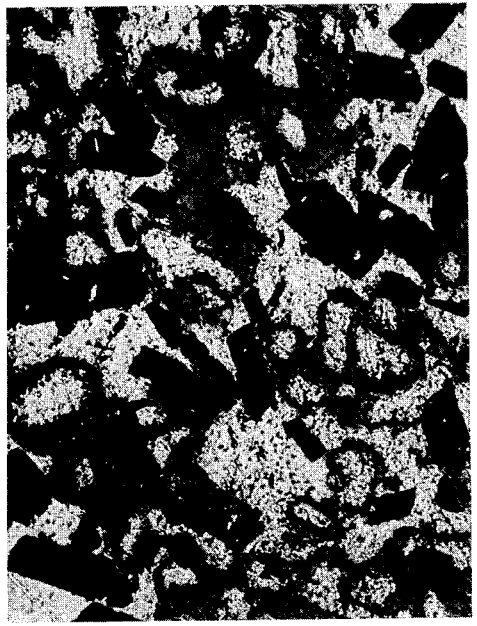
FIG. 9 shows a typical $B_4C/TiB_2$ microstructure after infiltration with aluminum.

A study of the wetting behavior of aluminum on B$_4$C and TiB$_2$ substrates indicates that aluminum infiltration of these porous composites is possible at 1473 K. FIG. 9 shows a typical B$_4$C/TiB$_2$ microstructure after infiltration with aluminum. Table 4 shows the theoretical densities for some final precursor/infiltrant combinations.

The invention also extends to the production of other composites which include a low exothermic component by combustion synthesis, particularly composites with a large amount of the low exothermic component. In accordance with the invention a compact is produced of a mixture of reactants, some of which produce the desired low exothermic component and some of which are high adiabatic temperature materials. The compact is then ignited and the exothermic heat of reaction from the combustion of the high adiabatic temperature material provides the heat for the combustion and production of the low exothermic component. To produce a predominantly low adiabatic temperature composite, the compact must be preheated.

Other examples of the invention besides B$_4$C/TiB$_2$ include TiC/SiC and MoSi$_2$/SiC. Like B$_4$C, silicon carbide SiC is a low exothermic material which cannot be produced by combustion synthesis. However, the silicon and carbon can be mixed with titanium, and the combustion synthesis of the SiC will be driven by the highly exothermic Ti-C reaction, to form a SiC/TiC composite. Instead of Ti, molybdenum can be mixed with the Si-C, and the highly exothermic Mo-Si reactions will produce a SiC/MoSi$_2$ composite. The initial heat of the compact is controlled to control the amount of SiC in the composite.

Accordingly, it is possible to fabricate B$_4$C/TiB$_2$ composites infiltrated with aluminum by combining combustion synthesis and liquid-metal infiltration techniques. The synthesis of B$_4$C/TiB$_2$ precursors is possible because of the exothermicity associated with the TiB$_2$ reactions. The relative amount of B$_4$C in these materials can be increased by simply increasing the initial temperature of the reactants prior to ignition. Comparison of thermodynamic calculations with experimental results indicates that a "critical" minimum adiabatic temperature of 2300 K. is required to sustain combustion of the reactants.

Changes and modifications in the specifically described embodiments can be carried out without departing from the scope of the invention which is intended to be limited only by the scope of the appended claims.

We claim:

1. A combustion synthesis method of forming B$_4$C rich B$_4$C/TiB$_2$ composites, comprising:
   forming a powder compact of powdered B, C and Ti, or oxides thereof, or hydrides thereof, or mixtures thereof in ratios which produce a B$_4$C rich composite of selected B$_4$C/TiB$_2$ mole ratio;
   preheating the powder compact to a predetermined initial temperature prior to combustion, the temperature being determined by the selected B$_4$C/TiB$_2$ mole ratio;
   producing a self-propagating combustion wave in the powder compact to produce a B$_4$C/TiB$_2$ composite of the selected B$_4$C rich mole ratio.

2. The method of claim 1 wherein the self-propagating combustion wave is initiated by igniting the powder compact.

3. The method of claim 1 comprising increasing the initial temperature to increase the B$_4$C/TiB$_2$ mole ratio.

4. The method of claim 1 further comprising:
   infiltrating the B$_4$C/TiB$_2$ composite with molten metal to form a substantially fully dense ceramic-metal composite.

5. The method of claim 4 comprising:
   infiltrating the B$_4$C/TiB$_2$ composite with aluminum or aluminum alloy.

6. A combustion synthesis method for forming a composite having a high adiabatic temperature highly exothermic component and a low adiabatic temperature low exothermic component, comprising:
   forming a powder compact of component forming reactants in ratios which produce a low exothermic component rich composite of selected component mole ratio;
   preheating the powder compact to a predetermined temperature prior to combustion, the temperature being determined by the selected component mole ratio;
   producing a self-propagating combustion wave in the powder compact to form a composite of the selected low exothermic component rich mole ratio.

7. The method of claim 6 further comprising:
   infiltrating the composite material with a molten metal to form a substantially fully dense material.

8. The method of claim 6 comprising selecting the component forming reactants from:
   (a) B, C, and Ti;
   (b) Si, C, and Ti;
   (c) Si, C, and Mo.

9. A B$_4$C/TiB$_2$ composite material produced by self-propagating combustion synthesis and having a controlled B$_4$C/TiB$_2$ mole ratio and infiltrated with molten metal to form a substantially fully dense B$_4$C/TiB$_2$-metal composite.

10. The composite material of claim 9 infiltrated with aluminum or aluminum alloy.

11. A low exothermic component rich combustion synthesis product produced by the process of claim 6.

12. A substantially fully dense metal infiltrated low exothermic component rich combustion synthesis product produced by the process of claim 7.

* * * * *